US011942252B2

(12) United States Patent
Matsuura

(10) Patent No.: US 11,942,252 B2
(45) Date of Patent: Mar. 26, 2024

(54) MAGNETIC BASE BODY CONTAINING METAL MAGNETIC PARTICLES AND ELECTRONIC COMPONENT INCLUDING THE SAME

(71) Applicant: TAIYO YUDEN CO., LTD., Tokyo (JP)

(72) Inventor: Hitoshi Matsuura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 637 days.

(21) Appl. No.: 16/426,350

(22) Filed: May 30, 2019

(65) Prior Publication Data

US 2019/0392978 A1 Dec. 26, 2019

(30) Foreign Application Priority Data

Jun. 21, 2018 (JP) ................................ 2018-117936

(51) Int. Cl.
*H01F 27/25* (2006.01)
*H01F 27/02* (2006.01)
*H01F 27/255* (2006.01)

(52) U.S. Cl.
CPC .......... *H01F 27/255* (2013.01); *H01F 27/02* (2013.01)

(58) Field of Classification Search
USPC .......................................... 336/65, 200, 232
See application file for complete search history.

(56) References Cited

U.S. PATENT DOCUMENTS

2008/0029300 A1* 2/2008 Harada .................... B22F 1/16 427/127
2011/0285486 A1* 11/2011 Maeda .................... B22F 1/025 335/297
2013/0127576 A1 5/2013 Hachiya et al.
2014/0002221 A1* 1/2014 Shin ........................ H01F 17/04 336/83

(Continued)

FOREIGN PATENT DOCUMENTS

CN 102292177 A 12/2011
CN 107785149 A 3/2018

(Continued)

OTHER PUBLICATIONS

Office Action dated Mar. 24, 2020 issued in corresponding Taiwanese Patent Application No. 108121310 with English translation (18 pages).

(Continued)

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

A magnetic base body in one embodiment of the invention includes first metal magnetic particles having a first average particle size, and second metal magnetic particles having a second average particle size smaller than the first average particle size. In the embodiment, a first insulating layer having a first thickness is provided on surfaces of the first metal magnetic particles, and a second insulating layer having a second thickness smaller than the first thickness is provided on surfaces of the second metal magnetic particles.

17 Claims, 11 Drawing Sheets

(56) References Cited

U.S. PATENT DOCUMENTS

| | | | | |
|---|---|---|---|---|
| 2014/0138569 | A1* | 5/2014 | Otsuka | H01F 27/255 252/62.54 |
| 2015/0028983 | A1 | 1/2015 | Ryu et al. | |
| 2015/0155084 | A1* | 6/2015 | Kim | H01F 17/0013 336/200 |
| 2016/0125987 | A1* | 5/2016 | Moon | H01F 1/26 252/62.54 |
| 2016/0155550 | A1* | 6/2016 | Ohkubo | H01F 1/24 336/233 |
| 2016/0314889 | A1 | 10/2016 | Ryu et al. | |
| 2017/0117082 | A1* | 4/2017 | Jeong | H01F 27/255 |
| 2018/0043431 | A1* | 2/2018 | Araki | H01F 1/153 |
| 2018/0061550 | A1* | 3/2018 | Lee | H01F 1/33 |
| 2019/0051445 | A1* | 2/2019 | Wada | H01F 1/34 |
| 2019/0287703 | A1* | 9/2019 | Ueshima | H01F 1/447 |
| 2019/0318854 | A1* | 10/2019 | Park | H01F 1/26 |
| 2020/0066437 | A1 | 2/2020 | Lee et al. | |

FOREIGN PATENT DOCUMENTS

| | | | |
|---|---|---|---|
| JP | 2006-179621 | A | 7/2006 |
| JP | 2010-034102 | A | 2/2010 |
| JP | 2013-110171 | A | 6/2013 |
| JP | 2014-179516 | A | 9/2014 |
| JP | 2015-26812 | A | 2/2015 |
| JP | 2016-103598 | A | 6/2016 |
| JP | 2016-162764 | A | 9/2016 |
| JP | 2016-208002 | A | 12/2016 |
| JP | 2018-037635 | A | 3/2018 |
| KR | 10-2017-0048724 | A | 5/2017 |
| KR | 10-2018-0009652 | A | 1/2018 |
| KR | 10-2018-0025068 | A | 3/2018 |
| WO | 2010-084812 | A1 | 7/2010 |

OTHER PUBLICATIONS

Notice of Reasons for Refusal dated Feb. 22, 2022, issued in corresponding Japanese Patent Application No. 2018-117936, with English translation (12 pgs.).

First Office Action dated Apr. 24, 2022 issued in corresponding Chinese Patent Application No. 201910502192.9, with English translation (20 pgs.).

Notice of Reasons for Refusal dated Sep. 4, 2022, issued in corresponding Japanese Patent Application No. 2018-117936 with English translation (14 pgs.).

Second Office Action dated Nov. 21, 2022, issued in corresponding Chinese Patent Application 201910502192.9, with English translation (16 pgs.).

Rejection Decision dated Mar. 30, 2023, issued in corresponding Chinese Patent Application No. 201910502192.9, with English translation (16 pgs.).

Request for the Submission of an Opinion dated Jan. 16, 2024, issued in corresponding Korean Patent Application No. 10-2019-0060393 with English translation (12 pgs.).

* cited by examiner

MAGNETIC BASE BODY CONTAINING METAL MAGNETIC PARTICLES AND ELECTRONIC COMPONENT INCLUDING THE SAME

CROSS-REFERENCE TO RELATED APPLICATIONS

This application is based on and claims the benefit of priority from Japanese Patent Application Serial No. 2018-117936 (filed on Jun. 21, 2018), the contents of which are hereby incorporated by reference in its entirety.

TECHNICAL FIELD

The present invention relates to a magnetic base body containing metal magnetic particles and an electronic component including the magnetic base body.

BACKGROUND

Various magnetic materials are used in electronic components such as inductors. For example, an inductor typically includes a magnetic base body made of a magnetic material, a coil conductor embedded in the magnetic base body, and an external electrode connected to an end of the coil conductor.

Ferrite is often used as a magnetic material for coils. Ferrite is suitable as the magnetic material for an inductor because of its high permeability.

Metal magnetic particles are also known as a magnetic material for electronic components other than ferrite. An insulating film having a low magnetic permeability is provided on the surface of the metal magnetic particles. The magnetic base body containing the metal magnetic particles can be produced by pressure molding. The magnetic base body containing the metal magnetic particles is produced, for example, by making a slurry by mixing and kneading the metal magnetic particles and a binder, pouring the slurry into a mold, and applying pressure to the slurry in the mold.

To increase the magnetic permeability of the magnetic base body containing the metal magnetic particles, a filling factor of the magnetic particles in the magnetic base body should be increased. There have been proposals of techniques for increasing the filling factor of the magnetic particles in the magnetic base body to increase the magnetic permeability. For example, Japanese Patent Application Publication No. 2006-179621 discloses a composite magnetic material containing first magnetic particles and second magnetic particles. This publication discloses that a molded product having magnetic particles filled therein at a high density can be produced by satisfying the following conditions:

- the average particle size of the second magnetic particles is equal to or less than 50% of that of the first magnetic particles, and
- $0.05 \leq Y/(X+Y) \leq 0.30$, where X is the content (wt %) of the first magnetic particles, and Y is the content (wt %) of the second magnetic particles. Japanese Patent Application Publication 2010-34102 discloses a clay-like magnetic base body in which two or more kinds of amorphous metal magnetic particles having different average particle sizes and an insulating binder are mixed. With such a magnetic base body, it is supposed that a high filling factor and a low core loss can be realized.

Japanese Patent Application Publication No. 2015-026812 discloses that the filling factor of metal magnetic particles can be increased by satisfying the following conditions:

- a magnetic base body contains first metal magnetic particles and second metal magnetic particles both made of an amorphous metal containing iron (Fe),
- the first magnetic particles are constituted by rough grains 15 μm or larger in long axis, and
- the second magnetic particles are constituted by fine grains 5 μm or smaller in long axis.

Further, Japanese Patent Application Publication No. 2016-208002 discloses that the filling factor of magnetic particles can be increased when a magnetic base body contains magnetic particles having three or more types of particle size distribution.

In a magnetic base body that contains two or more types of metal magnetic particles having different average particle sizes from each other, metal magnetic particles having a larger average particle size have a higher magnetic permeability than metal magnetic particles having a smaller average particle size. Therefore, magnetic flux tends to pass through a path with a high proportion of metal magnetic particles having a larger average particle size. For this reason, in the electronic component having a coil conductor embedded in the magnetic base body, when a direct current running through the coil conductor increases, magnetic saturation occurs sequentially from a magnetic path with a higher proportion of the metal magnetic particles having a large average particle size among a plurality of magnetic paths of the magnetic flux passing through the magnetic base body. Thus, there are paths in which magnetic saturation is likely to occur and paths in which magnetic saturation is less likely to occur in the conventional magnetic base body. Therefore, when a direct current running through the coil conductor increases, magnetic saturations occur sequentially from the path where magnetic saturation is more likely to occur to the path less likely to occur among the plurality of magnetic flux paths. Consequently the inductance of the component gradually decreases. As described above, the magnetic base body containing the metal magnetic particles has a drawback that the distribution of the magnetic flux therein is not uniform. In addition, when the magnetic base containing metal magnetic particles is used for an electronic component using a coil, the inductance gradually decreases due to the non-uniformity of the magnetic flux distribution. For this reason, it is difficult to increase an allowable current for the electronic coil component including the magnetic base body that contains the metal magnetic particles.

SUMMARY

An object of the present invention is to solve or address at least a part of the above problem. One specific object of the invention is to provide a magnetic base body having a high density of metal magnetic particles and an improved allowable current. Other objects of the present invention will be made apparent through description in the entire specification.

A magnetic base body according to one aspect of the invention includes first metal magnetic particles having a first average particle size, and second metal magnetic particles having a second average particle size smaller than the first average particle size. In the magnetic base body, a first insulating layer having a first thickness is provided on surfaces of the first metal magnetic particles, and a second insulating layer having a second thickness smaller than the first thickness is provided on surfaces of the second metal magnetic particles.

In the magnetic base body, when an average particle size ratio is defined as a ratio of the second average particle size to the first average particle size and a thickness ratio is defined as a ratio of the second thickness to the first thickness, a ratio of the average particle size ratio to the thickness ratio may be in the range of 0.5 to 1.5.

In the magnetic base body, both the first metal magnetic particles and the second metal magnetic particles may contain Fe, and the content rate of Fe in the second metal magnetic particles may be higher than the content rate of Fe in the first metal magnetic particles.

In the magnetic base body, both the first metal magnetic particles and the second metal magnetic particles may contain Si, and the content rate of Si in the first metal magnetic particles may be higher than the content rate of Si in the second metal magnetic particles.

The magnetic base body may further include third metal magnetic particles having a third average particle size smaller than the second average particle size. A third insulating layer may be provided on the surfaces of the third metal magnetic particles.

In the magnetic base body, the third metal magnetic particles may contain at least one selected from the group consisting of Ni and Co.

In the magnetic base body, at least one selected from the group consisting of the first insulating layer, the second insulating layer, and the third insulating layer may contain Si.

In the magnetic base body, the first metal magnetic particles may contain Fe, and the first insulating layer may contain an oxide of Fe.

The magnetic base body may further include a binder.

Another aspect of the invention relates to an electronic component. The electronic component includes the above-described magnetic base body.

The electronic component may include the magnetic base body and a coil embedded in the magnetic base body.

According to the disclosure of the specification, it is possible to provide a magnetic molded body having a high filling factor of metal magnetic particles and an improved allowable current.

DESCRIPTION OF THE PREFERRED EMBODIMENTS

With reference to the appended drawings, the following describes various embodiments of the present invention. Elements common to a plurality of drawings are denoted by the same reference signs throughout the plurality of drawings. It should be noted that the drawings do not necessarily appear to an accurate scale for the sake of convenience of explanation.

Figure 1:
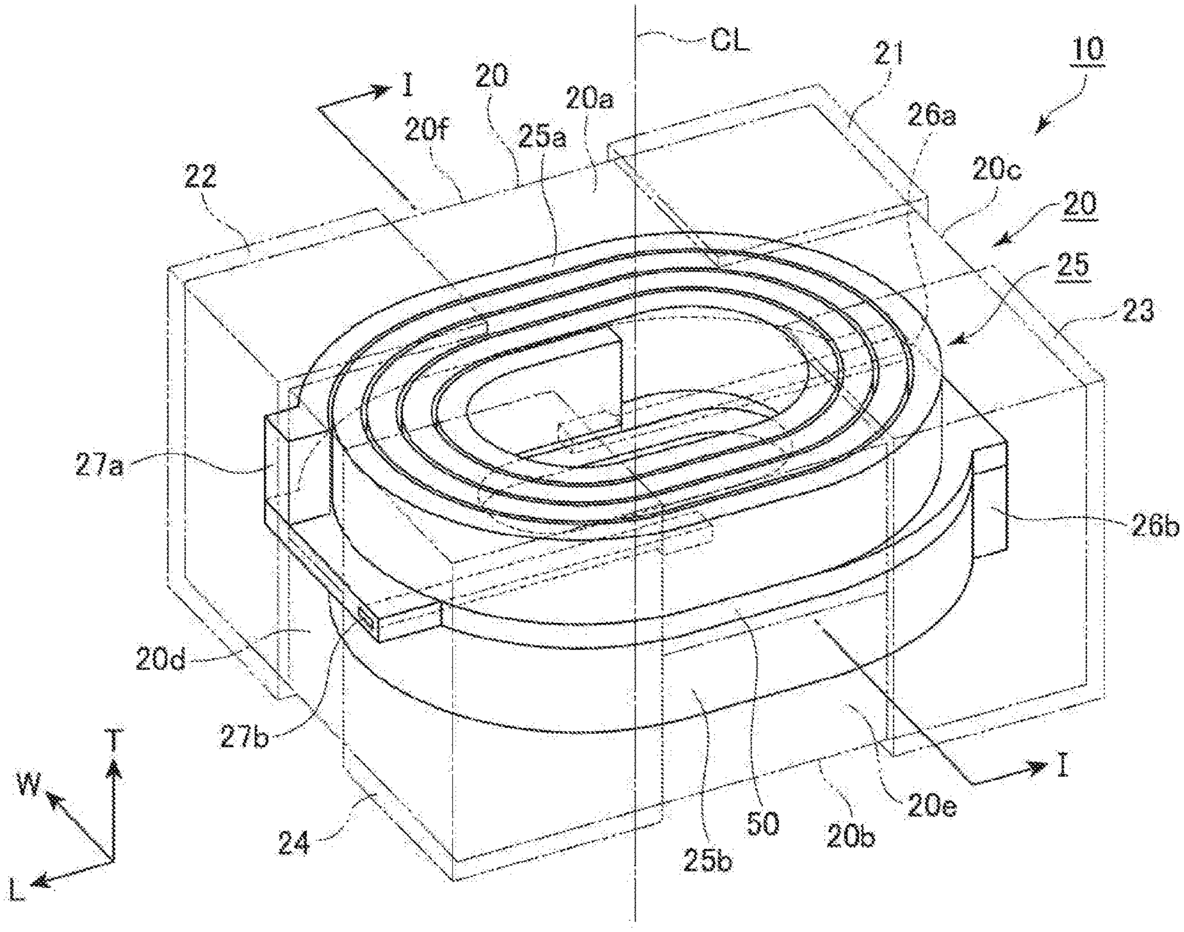
FIG. 1 is a perspective view of an electronic component that includes a coil according to one embodiment of the invention.
Figure 2:
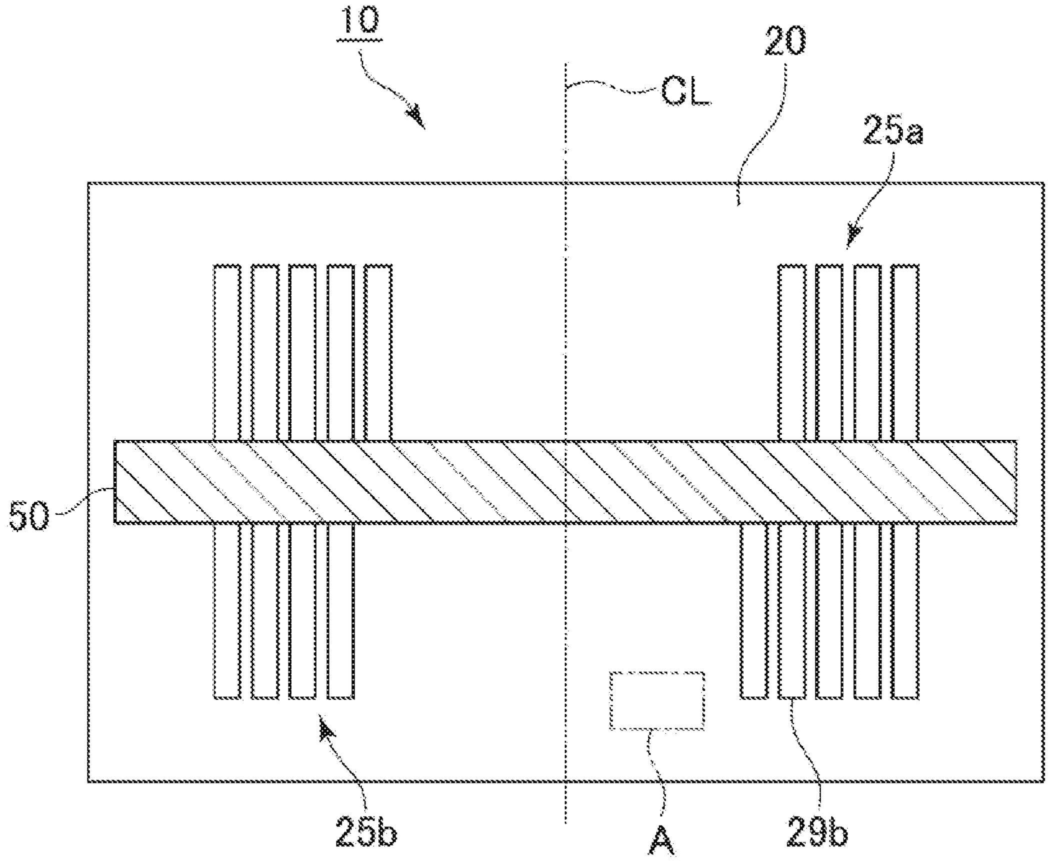
FIG. 2 is a view schematically showing a cross section of the electronic component using a coil in FIG. 1 cut along the line I-I.

An electronic component 10 that includes a coil therein according to one embodiment of the invention will be hereinafter described with reference to FIGS. 1 and 2. FIG. 1 is a perspective view of the electronic component 10 that includes a coil therein according to the embodiment, and FIG. 2 schematically shows a cross section of the electronic component 10 cut along the line I-I in FIG. 1. In FIG. 1, some of the elements of the electronic component 10 are omitted to show the interior structure of the electronic component 10.

The invention may be applied to various coils. The invention may be applied to, for example, inductors, filters, reactors, and various other coils and any other electronic components. Advantageous effects of the invention will be more remarkably exhibited when the invention is applied to coils and any other electronic components to which a large current is applied. An inductor used in a DC-DC converter is an example of a coil to which a large current is applied. FIGS. 1 and 2 show a magnetically coupled inductor used in a DC-DC converter as an example of the electric component 10 including a coil to which the invention is applied. In addition to the magnetically coupled inductor, the invention may be also applied to a transformer, a common mode choke coil, a coupled inductor, and various other electronic components including a magnetically coupled coil.

As shown in FIGS. 1 and 2, the electronic component 10 including a coil according to one embodiment of the invention includes a magnetic base body 20, a coil conductor 25 embedded in the magnetic base body 20, an insulating substrate 50, and four external electrodes 21 to 24. The coil conductor 25 includes a coil conductor 25*a* formed on the top surface of the insulating substrate 50 and a coil conductor 25*b* formed on the bottom surface of the insulating substrate 50.

The external electrode 21 is electrically connected to one end of the coil conductor 25*a*, and the external electrode 22 is electrically connected to the other end of the coil conductor 25*a*. The external electrode 23 is electrically connected to one end of the coil conductor 25*b*, and the external electrode 24 is electrically connected to the other end of the coil conductor 25*b*.

In this specification, a "length" direction, a "width" direction, and a "thickness" direction of the electronic component 10 are referred to as an "L" axis direction, a "W" axis direction, and a "T" axis direction in FIG. 1, respectively, unless otherwise construed from the context. The top-bottom direction of the electronic component 10 refers to the top-bottom direction in FIG. 1.

In one embodiment, the electronic component 10 that includes a coil therein has a length (the dimension in the direction L) of 1.0 to 2.6 mm, a width (the dimension in the direction W) of 0.5 to 2.1 mm, and a thickness (the dimension in the direction T) of 0.5 to 1.0 mm.

The insulating substrate 50 is made of a magnetic material into a plate shape. The magnetic material used for the insulating substrate 50 is, for example, a composite magnetic material containing a binder and filler particles. The binder is, for example, a thermosetting resin having an excellent insulation quality, examples of which include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

In one embodiment of the present invention, the filler particles used in the insulating substrate 50 are, for example, particles of a ferrite material, metal magnetic particles, particles of an inorganic material such as $SiO_2$ or $Al_2O_3$, glass-based particles, or any other known filler particles. Particles of a ferrite material applicable to the present invention are, for example, particles of Ni—Zn ferrite or particles of Ni—Zn—Cu ferrite.

In one embodiment, the insulating substrate 50 has a larger resistance than the magnetic base body 20. Thus, even when the insulating substrate 50 has a small thickness, electric insulation between the coil conductor 25*a* and the coil conductor 25*b* can be ensured.

The coil conductor 25*a* is formed in a pattern on the top surface of the insulating substrate 50. In the embodiment shown, the coil conductor 25*a* includes a turning portion having a plurality of turns around the coil axis CL.

Likewise, the coil conductor 25*b* is formed in a pattern on the bottom surface of the insulating substrate 50. In the embodiment shown, the coil conductor 25*b* includes a turning portion having a plurality of turns around the coil axis CL. In one embodiment of the present invention, the top surface of the turning portion of the coil conductor 25*b* is opposed to the bottom surface of the turning portion of the coil conductor 25*a*.

The coil conductor 25*a* has a lead conductor 26*a* on one end thereof and a lead conductor 27*a* on the other end. The coil conductor 25*a* is electrically connected to the external electrode 21 via the lead conductor 26*a* and is electrically connected to the external electrode 22 via the lead conductor 27*a*. Likewise, the coil conductor 25*b* has a lead conductor 26*b* on one end thereof and a lead conductor 27*b* on the other end. The coil conductor 25*b* is electrically connected to the external electrode 23 via the lead conductor 26*b* and is electrically connected to the external electrode 24 via the lead conductor 27*b*.

In one embodiment, the coil conductor 25*a* and the coil conductor 25*b* are formed by forming a patterned resist on the surface of the insulating substrate 50 and filling a conductive metal into an opening in the resist by plating.

In one embodiment, the magnetic base body 20 has a first principal surface 20*a*, a second principal surface 20*b*, a first end surface 20*c*, a second end surface 20*d*, a first side surface 20*e*, and a second side surface 20*f* The outer surface of the magnetic base body 20 may be defined by these six surfaces.

The external electrode 21 and the external electrode 23 are provided on the first end surface 20*c* of the magnetic base body 20. The external electrode 22 and the external electrode 24 are provided on the second end surface 20*d* of the magnetic base body 20. As shown, these external electrodes extend to the top surface 20*a* and the bottom surface 20*b* of the magnetic base body 20.

In one embodiment of the invention, the magnetic base body 20 is formed of a composite resin material obtained by mixing and kneading a large number of metal magnetic particles in a binder. In one embodiment, the binder contained in the magnetic base body 20 is a resin, for example, a thermosetting resin having an excellent insulating quality. Examples of the thermosetting resin used to form the magnetic base body 20 include benzocyclobutene (BCB), an epoxy resin, a phenolic resin, an unsaturated polyester resin, a vinyl ester resin, a polyimide resin (PI), a polyphenylene ether (oxide) resin (PPO), a bismaleimide-triazine cyanate ester resin, a fumarate resin, a polybutadiene resin, and a polyvinyl benzyl ether resin.

Figure 3:
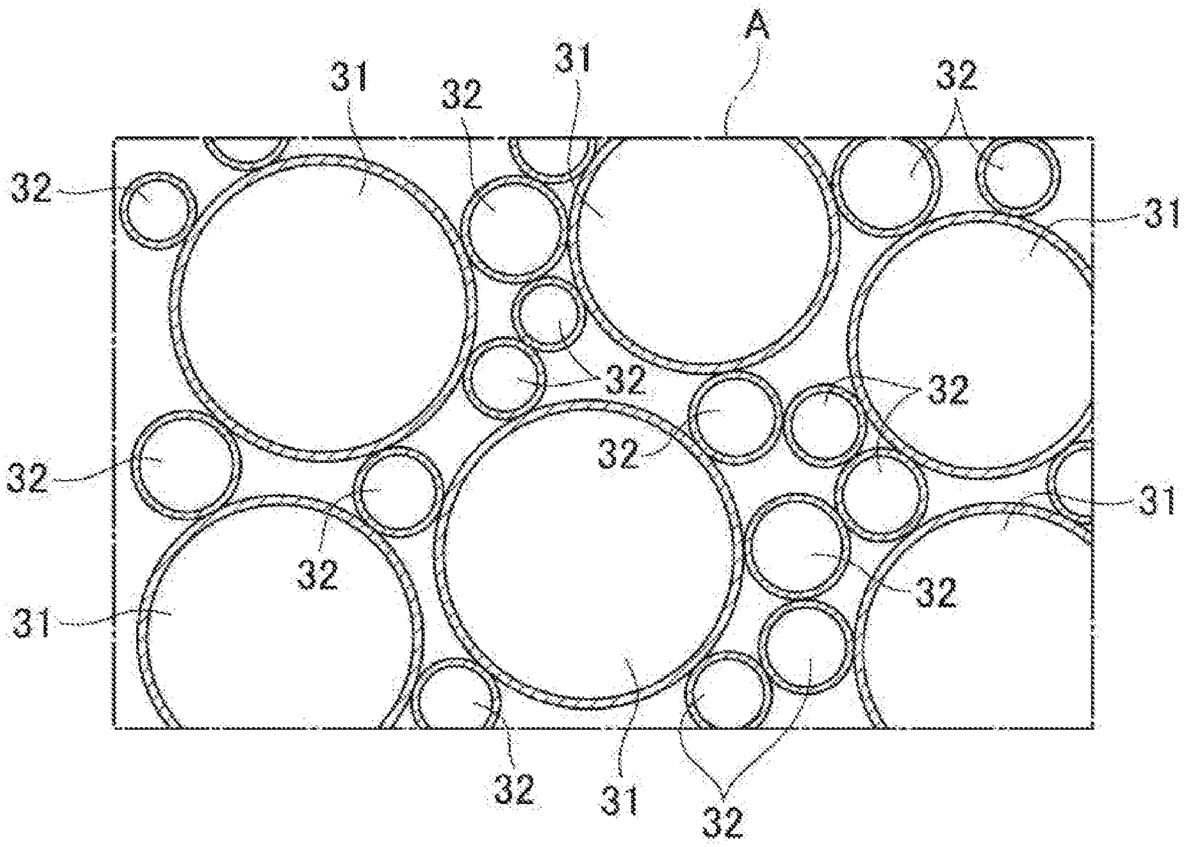
FIG. 3 is an enlarged schematic view of a region A of the magnetic base body of FIG. 2.

As mentioned above, the magnetic base body 20 contains a large number of metal magnetic particles. These metal magnetic particles include two or more types of metal magnetic particles having different particle sizes from each other. In one embodiment, the magnetic base body 20 may contain two types of metal magnetic particles having different average particle sizes from each other. FIG. 3 is an enlarged view of a section of the magnetic base body 20 including two types of metal magnetic particles that have different average particle sizes from one another. FIG. 3 is an enlarged schematic view of the region A of the magnetic base body 20 of FIG. 2. The region A is an arbitrary region in the magnetic base body 20. In the embodiment shown in FIG. 3, the magnetic base body 20 contains a plurality of first metal magnetic particles 31 and a plurality of second metal magnetic particles 32.

Figure 7:
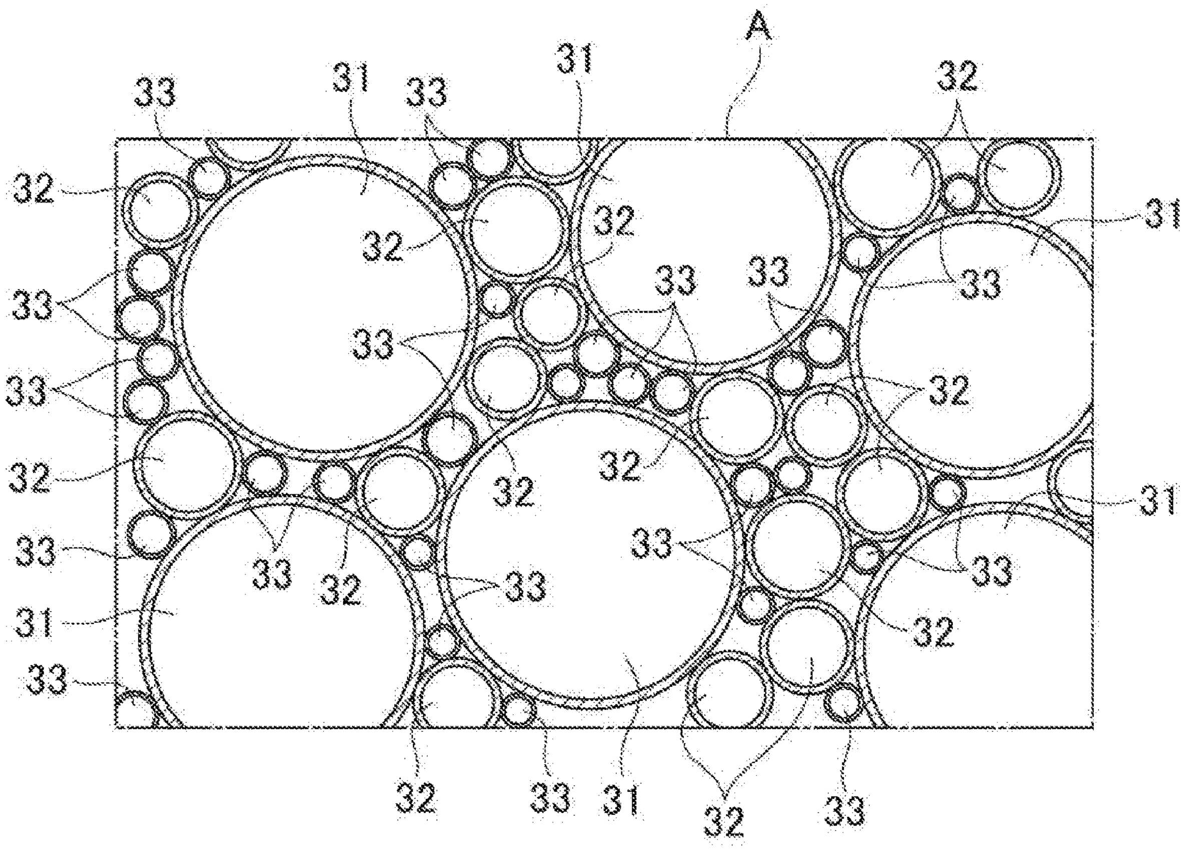
FIG. 7 is an enlarged schematic view of the region A of the magnetic base body in another embodiment of the invention.

In other embodiment, the magnetic base body 20 may contain three types of metal magnetic particles having different average particle sizes from each other. FIG. 7 is an enlarged view of a section of the magnetic base body 20 including the three types of metal magnetic particles that have different average particle sizes from one another. As illustrated in FIG. 7, the magnetic base body 20 may contain a plurality of third metal magnetic particles 33 in addition to the plurality of first metal magnetic particles 31 and the plurality of second metal magnetic particles 32.

It should be noted that the metal magnetic particle shown in FIG. 7 do not appear to an accurate scale, so as to emphasize the difference in particle size. In FIGS. 3 and 7, areas other than the first metal magnetic particles 31, the second metal magnetic particles 32, and the third metal magnetic particles 33 are filled with a binder. The first metal magnetic particles 31, the second metal magnetic particles 32, and the third metal magnetic particles 33 are bonded to each other by the binder.

Among the three types of metal magnetic particles, the first metal magnetic particles 31 have the largest average particle size. The average particle size of the first metal magnetic particles 31 is, for example, 1 μm to 200 μm. An average particle size of the second metal magnetic particles is smaller than that of the first metal magnetic particles 31.

In one embodiment, the average particle size of the second metal magnetic particles 32 is one-tenth (1/10) or less of the average particle size of the first metal magnetic particles 31. The average particle size of the second metal magnetic particles 32 is, for example, 0.1 μm to 20 μm. When the average particle size of the second metal magnetic particles 32 is one-tenth (1/10) or less of the average particle size of the first metal magnetic particles 31, the second metal magnetic particles 32 easily enter between the adjacent first metal magnetic particles 31. Consequently, the filling factor (density) of the metal magnetic particles in the magnetic base body 20 can be increased.

In one embodiment, an average particle size of the third metal magnetic particles is smaller than that of the second metal magnetic particles 32. In one embodiment, the average particle size of the third metal magnetic particles 33 is less than 2 μm. The average particle size of the third metal magnetic particles 33 may be 0.5 μm or smaller. Thus, even when the coil component is excited at a high frequency, it can be prevented that an eddy current occurs in the third metal magnetic particles 33. As a result, the coil component 10 has excellent high frequency characteristics.

Since the average particle size of the first metal magnetic particles 31 is larger than that of the second metal magnetic particles 32 and the average particle size of the second metal magnetic particles 32 is larger than that of the third metal magnetic particles 33, the first metal magnetic particles 31, the second metal magnetic particles 32, and the third metal magnetic particles 33 may be herein referred to as the large-sized particles, the middle-sized particles, and the small-sized particles, respectively.

The average particle size of the metal magnetic particles contained in the magnetic base body 20 is determined based on a particle size distribution. To determine the particle size distribution, the magnetic base body is cut along the thickness direction (T direction) to expose a section, and the section is scanned by a scanning electron microscope (SEM) to take a photograph at a 1000 to 2000-fold magnification, and the particle size distribution is determined based on the photograph. For example, the value at 50 percent of the particle size distribution determined based on the SEM photograph can be set as the average particle size of the metal magnetic particles.

Figure 5A:
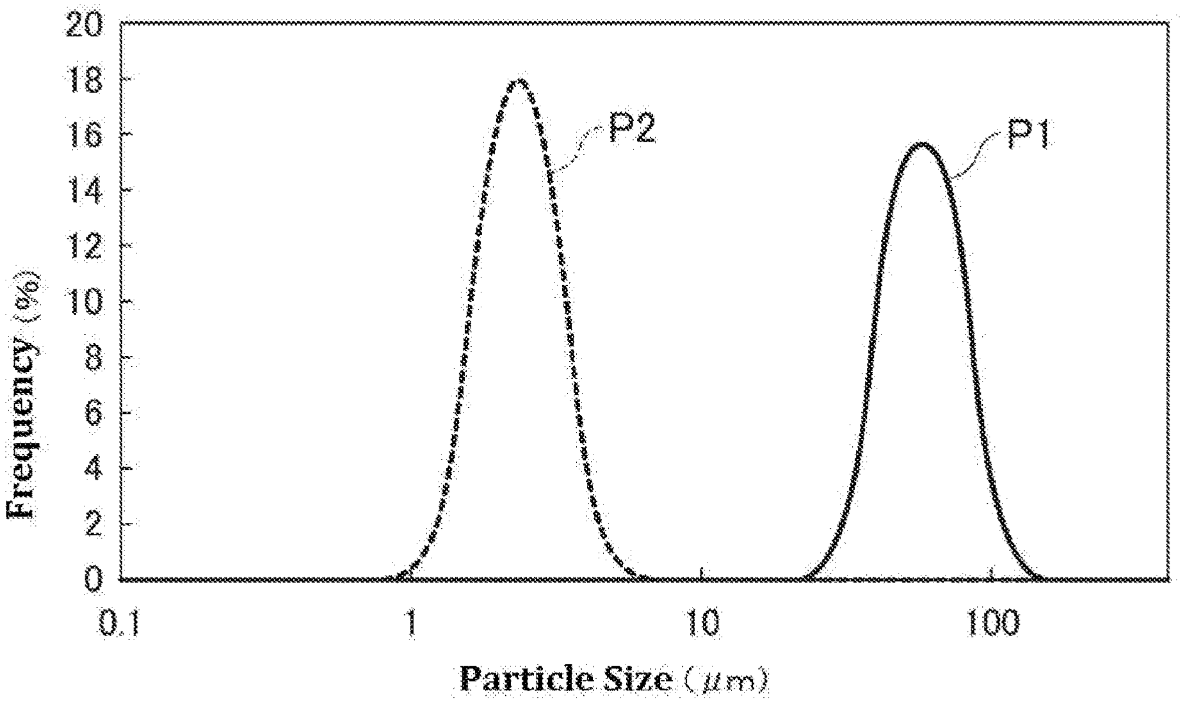
FIG. 5*a* is a graph showing a volumetric-based particle size distribution of metal magnetic particles contained in the magnetic base body of FIG. 2.
Figure 5B:
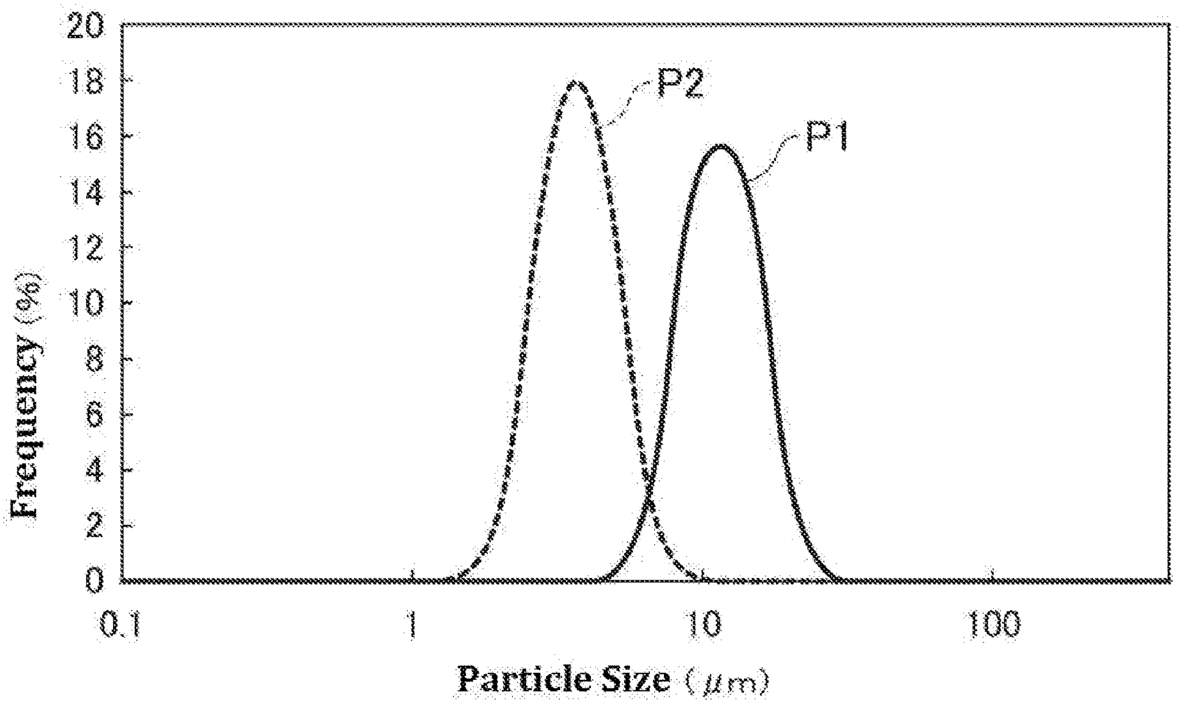
FIG. 5*b* is a graph showing a volumetric-based particle size distribution of metal magnetic particles contained in the magnetic base body of FIG. 2.
Figure 6:
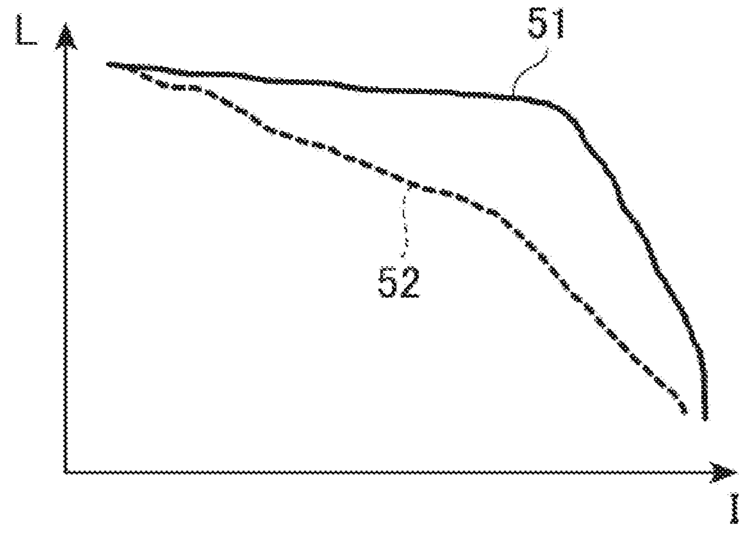
FIG. 6 is a graph schematically showing a current-inductor characteristic of a magnetic material according to an embodiment of the invention.

When the magnetic base body 20 includes two types of metal magnetic particles having different average particle sizes, the particle size distribution obtained based on the SEM photograph has the profile shown in FIG. 5*a* or FIG. 5*b*. FIGS. 5*a* and 5*b* are graphs showing examples of the particle size distribution of the first metal magnetic particles 31 and the second metal magnetic particles 32 contained in the magnetic base body 20. As shown, the particle size distribution graph includes two peaks: the first peak P1 and the second peak P2. The particle size distribution including the first peak P1 represents the particle size distribution including the first peak P1 represents the particle size distribution of the first metal magnetic particles 31, and the particle size distribution including the second peak P2 represents the particle size distribution of the second metal magnetic particles 32. The magnetic base body 20 in one embodiment is obtained by mixing the first metal magnetic particles 31 and the second metal magnetic particles 32 at a predetermined ratio. FIG. 5*a* or FIG. 5*b* shows the particle size distributions of these two types of metal magnetic particles mixed together. In one embodiment, as shown in FIG. 5*a*, the particle size distribution of the first metal magnetic particles 31 does not at all overlaps with that of the second metal magnetic particles 32 or there is very little overlap between them. In one embodiment, as shown in FIG. 5*b*, the particle size distribution of the first metal magnetic particles 31 may overlap with that of the second metal magnetic particles 32. For example, the particle size distribution of the first metal magnetic particles 31 may overlap with that of the second metal magnetic particles 32 such that a value at 5% in the particle size distribution of the first metal magnetic particles 31 is more than or equal to a value at 95% in the particle size distribution of the third metal magnetic particles 32. As described above, the average particle size of the two types (or three or more types) of metal magnetic particles contained in the magnetic base body actually fabricated can be determined based on the particle size distributions.

When the magnetic base body 20 further contains the third metal magnetic particles 33, a third peak indicating the particle size distribution of the third metal magnetic particles 33 appears. The particle size distribution of the second metal magnetic particles 32 and the particle size distribution of the third metal magnetic particles 33 may or may not overlap each other.

As described above, two or more types of metal magnetic particles having different average particle sizes may be mixed together to increase the density of the metal magnetic particles in the magnetic base body. In one embodiment, the filling factor of the magnetic particles in the magnetic main body is 87% or higher. In this way, it is possible to obtain the magnetic base body with an excellent magnetic permeability.

In the specification, the average particle size of the first metal magnetic particles 31 may be referred to as a first average particle size, the average particle size of the second metal magnetic particles 32 may be referred to as a second average particle size, and the average particle size of the third metal magnetic particles 33 may be referred to as a third average particle size.

In one embodiment, the first metal magnetic particles 31, the second metal magnetic particles 32, and the third metal magnetic particles 33 may be formed in a spherical shape or may be formed in a flattened shape. In other embodiment, the magnetic base body 20 may contain four or more types of metal magnetic particles having different average particle sizes from each other.

Figure 4A:
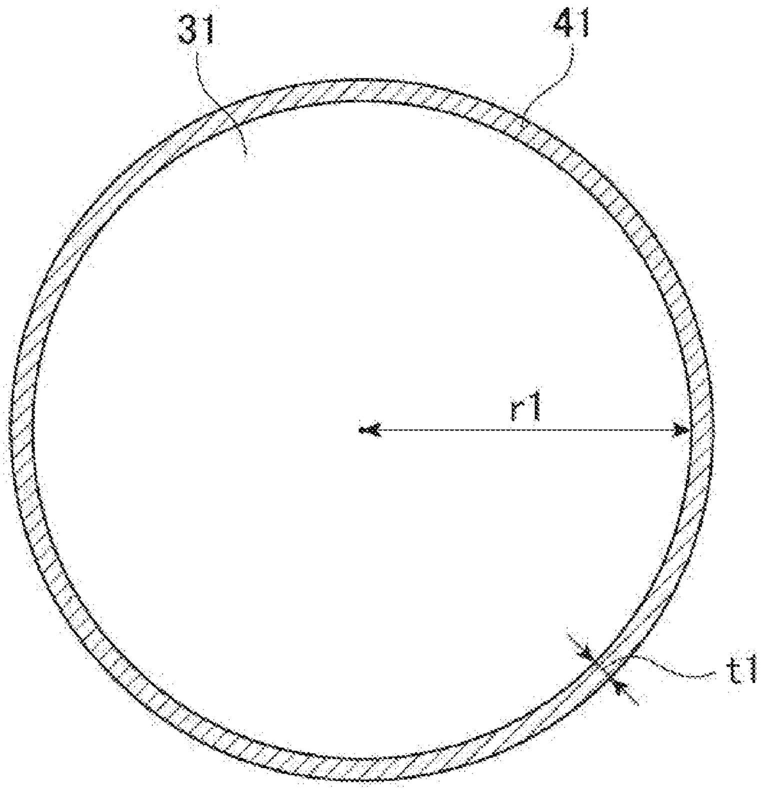
FIG. 4*a* schematically shows a section of a first metal magnetic particle contained in the magnetic base body of FIG. 2.

As shown in FIG. 4*a*, a first insulating layer 41 is provided on the surface of the first metal magnetic particles 31. It is preferable that the first insulating layer 41 be formed to cover the entire surface of the first metal magnetic particle 31 so that the first metal magnetic particles 31 do not directly contact with other metal magnetic particles, which prevents the particles from being shorted out. The first insulating layer 41 may sometime cover only a part of the surface of the first metal magnetic particle 31, not the entire surface. In the manufacturing process of the electronic component 10, a part of the first insulating layer 41 may incidentally come off from the first metal magnetic particles 31. In such a case, the first insulating layer 41 will cover only part of the surface, not all of it.

Figure 4B:
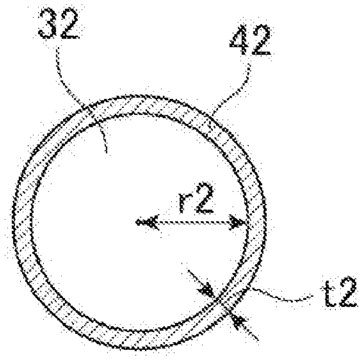
FIG. 4*b* schematically shows a section of a second metal magnetic particle contained in the magnetic base body of FIG. 2.

As shown in FIG. 4*b*, a second insulating layer 42 is provided on the surfaces of the second metal magnetic particles 32. The second insulating layer 42 covers part of the surface or the entire surface of the second metal magnetic particle 32.

Figure 8:
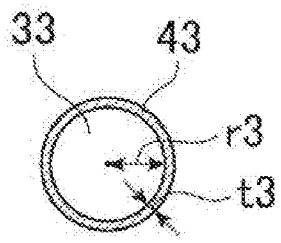
FIG. 8. schematically shows a section of a third metal magnetic particle contained in the magnetic base body of FIG. 7.

As shown in FIG. 8, a third insulating layer 43 is provided on the surfaces of the third metal magnetic particles 33. The third insulating layer 43 covers part of the surface or the entire surfaces of the third metal magnetic particle 33. The third insulating layer 43 can be omitted depending on the insulation properties required for the magnetic base body 20.

In one embodiment, the first metal magnetic particles 31, the second metal magnetic particles 32, and the third metal magnetic particles 33 may be formed of crystalline or non-crystalline metal or alloy containing at least one element selected from the group consisting of iron (Fe), nickel (Ni), and cobalt (Co). The first metal magnetic particles 31, the second metal magnetic particles 32, and the third metal magnetic particles 33 may further contain at least one element selected from the group consisting of silicon (Si), chromium (Cr) and aluminum (Al). The first metal magnetic particles 31, the second metal magnetic particles 32, and the third metal magnetic particles 33 may be particles made of pure iron composed of Fe and unavoidable impurities. The first metal magnetic particles 31, the second metal magnetic particles 32, and the third metal magnetic particles 33 may be made of an Fe-based amorphous alloy containing iron (Fe). The Fe-based amorphous alloy includes, for example, Fe—Si, Fe—Si—A], Fe—Si—Cr—B, Fe—Si—B—C, and Fe—Si—P—B—C. The first metal magnetic particles 31 may include only particles of a single type of metal or a single type of alloy. For example, all the first metal magnetic particles 31 may be particles made of pure iron or a specific type of Fe-based amorphous alloy. The same applies to the second metal magnetic particles 32 and the third metal magnetic particles 33. Alternatively, the first metal magnetic particles 31 may include particles of two or more different types of metals or alloys. For example, the first metal magnetic particles 31 may include a plurality of particles having the first metal magnetic particles 31 made of pure iron and a plurality of particles having the first metal magnetic particles 31 made of Fe—Si. The same applies to the second metal magnetic particles 32 and the third metal magnetic particles 33.

In one embodiment, both the first metal magnetic particles 31 and the second metal magnetic particles contain Fe, and the content rate of Fe in the second metal magnetic particles 32 is higher than the content rate of Fe in the first metal magnetic particles 31.

As described above, in one embodiment, the first metal magnetic particles 31 and the second metal magnetic particles 32 may be formed of pure iron or an alloy containing Fe. In this case, the first metal magnetic particles 31 and the second metal magnetic particles 32 may be formed such that the content rate of Fe in the second metal magnetic particles 32 is higher than the content rate of Fe in the first metal magnetic particles 31. For example, the first metal magnetic particles 31 contain 72 wt % to 80 wt % of Fe, and the second metal magnetic particles 32 contain 87 wt % to 99.8 wt % of Fe. The third metal magnetic particles 33 may contain, for example, 50 wt % to 93 wt % of Fe. The content rate of Fe in the second metal magnetic particles 32 and the third metal magnetic particles 33 may be 92 wt % or larger.

As described above, the first metal magnetic particles 31, the second metal magnetic particles 32, and the third metal magnetic particles 33 may each contain Si. In one embodiment, the first metal magnetic particles 31 and the second metal magnetic particles 32 are formed such that the content rate of Si in the first metal magnetic particles 31 is higher than the content rate of Si in the second metal magnetic particles 32. In one embodiment, the second metal magnetic particles 32 and the third metal magnetic particles 33 are formed such that the content rate of Si in the second metal magnetic particles 32 is higher than the content rate of Si in the third metal magnetic particles 33.

As described above, the first metal magnetic particles 31, the second metal magnetic particles 32, and the third metal magnetic particles 33 may each contain Ni or Co or both. In one embodiment, the first metal magnetic particles 31 and the second metal magnetic particles 32 are formed such that the content rate of Si in the second metal magnetic particles 31 is higher than the content rate of Ni in the first metal magnetic particles 31. In one embodiment, the first metal magnetic particles 31 and the second metal magnetic particles 32 are formed such that the content rate of Co in the second metal magnetic particles 32 is higher than the content rate of Co in the first metal magnetic particles 31. In one embodiment, the second metal magnetic particles 32 and the third metal magnetic particles 33 are formed such that the content rate of Ni in the third metal magnetic particles 33 is higher than the content rate of Ni in the second metal magnetic particles 32. In one embodiment, the second metal magnetic particles 32 and the third metal magnetic particles 33 are formed such that the content rate of Co in the third metal magnetic particles 33 is higher than the content rate of Co in the second metal magnetic particles 32.

The first insulating layer 41, the second insulating layer 42, and the third insulating layer 43 will be now described. The first insulating layer 41, the second insulating layer 42, and the third insulating layer 43 are formed of an organic material or an inorganic material. As the material for the first insulating layer 41, the second insulating layer 42, and the third insulating layer 43, a nonmagnetic material or a magnetic material having a magnetic permeability lower than that of the first metal magnetic particles 31, the second metal magnetic particles 32, and the third metal magnetic particles 33 may be used.

As the organic material for the first insulating layer 41, the second insulating layer 42, and the third insulating layer 43, epoxy, phenol, silicone, polyimide, or any other thermosetting resin can be used. When silicone is used as the organic material for the first insulating layer 41, the first metal magnetic particles 31 are immersed in a silicone resin solution in which a silicone resin is dissolved in a petroleum-based organic solvent such as xylene, and then the organic solvent is evaporated from the resin solution to form the first silicon insulating layer 41 on the surfaces of the first metal magnetic particles 31. In order to improve the uniformity of the film thickness, the silicone resin solution may be stirred, if necessary. The second insulating layer 42 and the third insulating layer 43 can also be formed in the same manner as the first insulating layer 41.

As the inorganic material for the first insulating layer 41, the second insulating layer 42, and the third insulating layer 43, phosphate, borate, chromate, glass (for example, $SiO_2$), and metal oxide (for example, $Fe_2O_3$ or $Al_2O_3$) can be used.

The first insulating layer 41, the second insulating layer 42, and the third insulating layer 43 may be formed by a powder mixing method, an immersion method, a sol-gel method, a CVD method, a PVD method, or various other known methods.

The $SiO_2$ layer may be formed on the surfaces of the metal magnetic particles, for example, through a coating process using the sol-gel method. More specifically, a process solution containing TEOS (tetraethoxysilane, $Si(OC_2H_5)_4$), ethanol, and water is mixed into a mixed solution containing metal magnetic particles, ethanol, and aqueous ammonia to prepare the mixture. Then, the mixture is stirred and then filtered to separate the metal magnetic particles that have an $SiO_2$ insulating layer formed on their surface.

When the first insulating layer 41, the second insulating layer 42, and the third insulating layer 43 are made of glass or metal oxide, heat treatment may be performed on the first metal magnetic particles 31, the second metal magnetic particles 32, and the third metal magnetic particles 33 on which these insulating layers are formed respectively. The heat treatment may be performed under the atmospheric air, vacuum, or an inert gas atmosphere. As an inert gas, a noble gas such as nitrogen, helium or argon may be used. The heating temperature is, for example, 400° C. to 850° C., or 500° C. to 750° C. By this heat treatment, it is possible to reduce stress distortion in the first metal magnetic particles 31, the second metal magnetic particles 32, and the third metal magnetic particles 33. For example, when the heating temperature is 650° C. or less, heating is performed for 60 minutes or more. When the heating temperature is higher than 650° C., the heating is performed for less than 60 minutes. By performing the heat treatment with this heating temperature for this heating period, a desired volume resistivity is realized in the first insulating layer 41, the second insulating layer 42, and the third insulating layer 43. The volume resistivity of the first insulating layer 41, the second insulating layer 42, and the third insulating layer 43 is, for example, $10^6$ Ω·cm or more. Further, by performing the heat treatment at the above-mentioned heating temperature for the above-mentioned heating period, it is possible to suppress excessive oxidation reaction in the first metal magnetic particles 31, the second metal magnetic particles 32, and the third metal magnetic particles 33. In this way, it is possible to prevent or suppress that the magnetic permeability of the first metal magnetic particles 31, the second metal magnetic particles 32, and the third metal magnetic particles 33 is lowered by the heat treatment. The invention is not limited to the method of heat treatment and the heating temperature described above.

The thicknesses of the first insulating layer 41, the second insulating layer 42, and the third insulating layer 43 made of an organic material may be 1 μm to 50 μm or 10 μm to 30 μm. The thicknesses of the first insulating layer 41, the second insulating layer 42, and the third insulating layer 43 made of an inorganic material may be 1 nm to 500 nm, 1 nm to 100 nm, 1 nm to 50 nm, or 1 nm to 20 nm. An insulating layer having a thickness of 1 nm to 50 nm or 1 nm to 20 nm can be obtained by a sol-gel method.

The thickness of the insulating layer on the metal magnetic particles contained in the actually fabricated magnetic base body is determined based on a photograph of the base body. To take a photograph, the magnetic base body is cut along the thickness direction (T direction) to expose a section, and the section is scanned by a scanning electron microscope (SEM) to take the photograph at a 50000 to 100000-fold magnification. For example, the thickness of the insulating layer provided on one metal magnetic particle included in the SEM photograph may be defined as the dimension of the insulating layer in a direction along a virtual straight line connecting the geometric center of gravity of the metal magnetic particle and the geometric center of gravity of another metal magnetic particle adjacent to the metal magnetic particle. The thickness of the insulating layer provided on one metal magnetic particle included in the SEM photograph may be defined as the dimension of the insulating layer in a direction along a virtual line extending in the vertical direction of the SEM photograph from the geometric center of gravity of the metal magnetic particle in the SEM photograph. In this case, since the dimension at a position above the center of gravity and the dimension at a position below the center of gravity are measured, the average of these two measured dimensions may be taken as the thickness of the insulating layer of the metal magnetic particle. In a case where there are a plurality of first metal magnetic particles in the SEM photograph, the thickness of the insulating layer may be measured for each of the plurality of metal magnetic particles, and the average value may be taken as the thickness of the insulating layer provided on the first metal magnetic particles in the magnetic base body.

Materials for the first insulating layer 41, the second insulating layer 42, and the third insulating layer 43 are selected depending on the insulation properties required for the magnetic base body 20. More than one material may be used to form the first insulating layer 41, the second insulating layer 42, and the third insulating layer 43. The first insulating layer 41, the second insulating layer 42, and the third insulating layer 43 may each include two or more layers made of different materials.

The second insulating layer 42 is formed such that it has a smaller thickness than the first insulating layer 41. The thickness of the second insulating layer 42 is, for example, one tenth (1/10) or less of the thickness of the first insulating layer 41. The third insulating layer 43 is formed such that it has a smaller thickness than the first insulating layer 42. The thickness of the third insulating layer 43 is, for example, one tenth (1/10) or less of the thickness of the second insulating layer 42.

In this specification, the thicknesses of the first insulating layer 41, the second insulating layer 42, and the third insulating layer 43 may be referred to as a first thickness, a second thickness, and a third thickness, respectively.

As described later, the magnetic base body 20 may be formed by pressure molding a composite resin material that includes the first metal magnetic particles 31, the second metal magnetic particles 32, and the third metal magnetic particles 33 provided with the first insulating layer 41, the second insulating layer 42, and the third insulating layer 43 respectively. An insulating layer formed of an inorganic material has a smaller change in its film thickness at the time of pressure molding compared to an insulating layer formed of an organic material. Therefore, in order to obtain the film thickness in a desired range, it is desirable to use an inorganic material as the material for the first insulating layer 41, the second insulating layer 42, and the third insulating layer 43.

In one embodiment, when an average particle size ratio is defined as a ratio of the second average particle size which is the average particle size of the second metal magnetic particles 32 to the first average particle size which is the average particle size of the first metal magnetic particles 31, and when a thickness ratio is defined as a ratio of the second thickness which is the thickness of the second insulating layer 42 provided on the second metal magnetic particles 32 to the first thickness which is the thickness of the first insulating layer 41 provided on the first metal magnetic particles 31, a ratio of the average particle size ratio to the thickness ratio is in the range of 0.5 to 1.5. For convenience of explanation, when the average particle size of the first metal magnetic particles 31 is denoted by r1 and the first thickness of the first insulating layer 41 is denoted by t1 in FIG. 4*a*, and the average particle size of the second metal magnetic particles 32 is denoted by r2 and the second thickness of the second insulating layer 42 is denoted by t2 in FIG. 4*b*, the average particle size ratio is represented by r2/r1, and the thickness ratio is represented by t2/t1. Thus, the ratio of the average particle size ratio r2/r1 to the thickness ratio t2/t1 is r2·t1/r1·t2. As described above, in one embodiment, r2 is one tenth (1/10) or less of r1, and t2 is one tenth (1/10) or less of t1. Assuming that r2 is one twentieth (1/20) of r1 and t2 is one fifteenth (1/15) of t1, r2·t1/r1·t2, which is the ratio of the average particle size ratio r2/r1 to the thickness ratio t2/t1, is 0.75.

Next, a description is given of an example of a manufacturing method of the electronic component 10 including a coil. An insulating substrate made from a magnetic material into a plate shape is first prepared. This insulating substrate is configured, for example, in the same manner as the insulating substrate 50 described above. Next, a photoresist is applied to the top surface and the bottom surface of the insulating substrate, and then conductive patterns are transferred onto the top surface and the bottom surface of the insulating substrate by exposure, and development is performed. As a result, a resist having an opening pattern for forming a coil conductor is formed on each of the top surface and the bottom surface of the insulating substrate. For example, the conductive pattern formed on the top surface of the insulating substrate corresponds to the coil conductor 25*a* described above, and the conductive pattern formed on the bottom surface of the insulating substrate corresponds to the coil conductor 25*b* described above.

Next, a conductive metal is filled into each of the opening patterns by plating. Next, the resists are removed from the insulating substrate by etching to form the coil conductors on the top surface and the bottom surface of the insulating substrate.

A magnetic base body is subsequently formed on both surfaces of the insulating substrate having the coil conductors formed thereon. This magnetic base body corresponds to, for example, the magnetic base body 20 described above. The magnetic base body is fabricated by, for example, sheet molding. More specifically, the insulating substrate having the coil conductors formed thereon is placed in a mold, and a resin composition (a slurry) produced by mixing three types of metal magnetic particles and a thermosetting resin (e.g., an epoxy resin) is also placed into the mold and pressurized, thereby a molded product including the insulating substrate and the magnetic base body formed thereon can be obtained. Instead of or in addition to pressurizing the resin composition, the resin composition may be heated. The three types of magnetic particles are, for example, the first metal magnetic particles 31, the second metal magnetic particles 32, and the third metal magnetic particles 33 described above.

Next, a predetermined number of external electrodes are formed on the molded product including the insulating substrate and the magnetic base body formed thereon. These external electrodes correspond to, for example, the external electrodes 21 to 24 described above. Each of the external electrodes is formed by applying a conductive paste onto the surface of the magnetic base body to form a base electrode and forming a plating layer on the surface of the base electrode. The plating layer is constituted by, for example, two layers including a nickel plating layer containing nickel and a tin plating layer containing tin.

The electronic component 10 including a coil according to one embodiment is obtained through the above steps. The above-described method for producing the electronic component 10 is merely one example, which does not limit methods for producing the electronic component 10.

Figure 9:
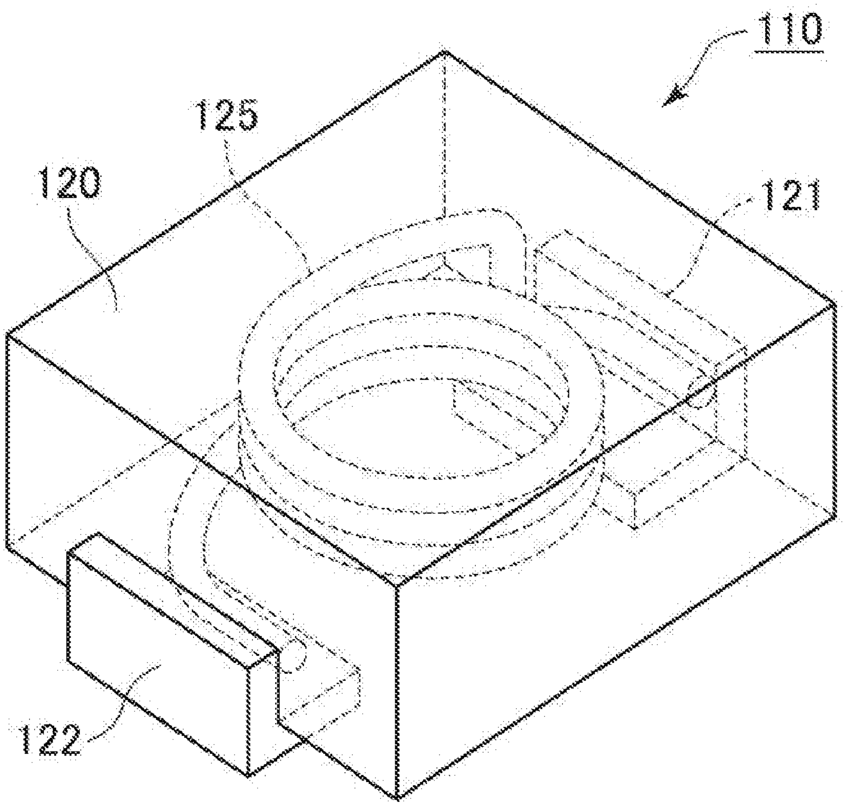
FIG. 9 is a perspective view of an electronic component using a coil according to another embodiment of the invention.
Figure 10:
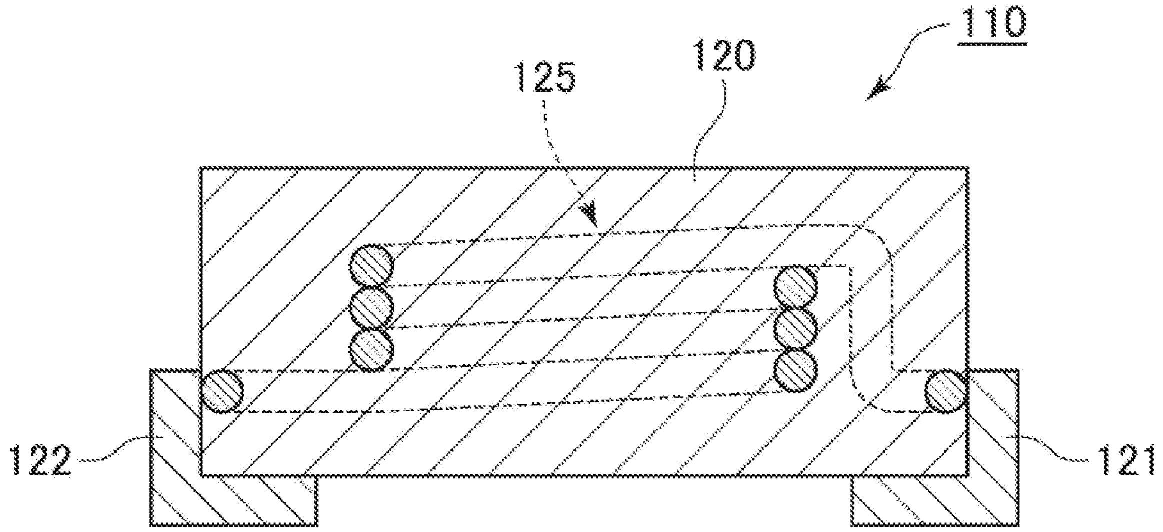
FIG. 10 schematically shows a cross section of the electronic coil component of FIG. 9.

An electronic component 110 that includes a coil therein according to another embodiment of the invention will be hereinafter described with reference to FIGS. 9 and 10. In this embodiment, the electronic component 110 that includes a coil is an inductor. As shown in FIGS. 9 and 10, the electronic component 110 includes a magnetic base body 120, a coil conductor 125 embedded in the magnetic base 120, an external electrode 121, and an external electrode 122. The coil conductor 125 is configured such that one end is electrically connected to the external electrode 121 and the other end is electrically connected to the external electrode 122.

Similarly to the magnetic base body 20, the magnetic base body 120 contains two or more types of metal magnetic particles having different average particle sizes from each other. The description of the magnetic substrate 20 in the specification also applies to the magnetic substrate 120 unless the context is contradictory.

Advantageous effects of the embodiments will be now described. In the embodiment, the magnetic base body 20 contain two or more types of metal magnetic particles (for example, the first metal magnetic particles 31 and the second metal magnetic particles 32) having different average particle sizes from each other. Thus, it is possible to increase the density of the metal magnetic particles in the magnetic base body 20 compared with a magnetic base body containing only one type of metal magnetic particles.

In the above embodiment, the magnetic base 20 includes the first metal magnetic particles 31 having the first average particle size and the second metal magnetic particles 32 having the second average particle size smaller than the first average particle size. In the embodiment, the first insulating layer 41 having the first thickness is provided on the surfaces of the first metal magnetic particles, and the second insulating layer 42 having the second thickness smaller than the first thickness is provided on the surfaces of the second metal magnetic particles. In general, in a magnetic base body containing two or more types of metal magnetic particles having different average particle sizes, a magnetic flux is more likely to pass through particles having a larger average particle size than particles having a small average particle size. For this reason, when insulating layers having the same thickness are formed on the metal magnetic particles regardless of the average particle sizes, a magnetic flux distribution in the magnetic base body becomes non-uniform. Since the metal magnetic particles having a large average particle size and the metal magnetic particles having a small average particle size have insulating layers with the same thickness, an interparticle distance between the magnetic particles having the large average particle size and an interparticle distance between the metal magnetic particles having the small average particle size may become substantially same. This causes the non-uniformity of the magnetic flux distribution in the magnetic base body. Here, the interparticle distance between the metal magnetic particles may mean the distance between the outer surfaces of adjacent two metal magnetic particles. Therefore, in the magnetic base body, when an insulating layer having the same thickness is formed on metal magnetic particles regardless of their average particle sizes, magnetic saturation first occurs in the magnetic path that passes through the metal magnetic particles having a large average particle size. Magnetic saturation sequentially occurs from the magnetic paths passing through the metallic magnetic particles having larger average particle sizes to the magnetic paths passing through the metallic magnetic particles having smaller average particle sizes. Whereas according to the above embodiment, the first insulating layer 41 on the first metal magnetic particles 31 is formed thicker than the second insulating layer 42 on the second metal magnetic particles 32. Thereby it is possible to prevent concentration of magnetic flux in the magnetic path including the first metal magnetic particles 31. Therefore, the magnetic flux distribution in the magnetic base body can be made more uniform. Consequently, the magnetic saturation characteristics of the magnetic base body can be improved. When the magnetic base body is used in an electronic component that includes a coil, the allowable current of the electronic component can be increased.

In the above embodiment, the average particle size ratio is defined as a ratio of the second average particle size which is the average particle size of the second metal magnetic particles 32 to the first average particle size which is the average particle size of the first metal magnetic particles 31, and the thickness ratio is defined as a ratio of the second thickness of the second insulating layer 42 to the first thickness of the first insulating layer 41. The ratio of the average particle size ratio to the thickness ratio is in the range of 0.5 to 1.5. According to the embodiment, in each of the plurality of magnetic paths in the magnetic base body 20, a ratio of the length of the high permeability magnetic path occupied by the metal magnetic particles (the first metal magnetic particles 31 and the second metal magnetic particles 32) to the length of the low permeability magnetic path occupied by the insulating layer (the first insulating layer 41 and the second insulating layer 32) is in the range of 0.5 to 1.5. Thus, the difference in the effective permeability among the plurality of magnetic paths in the magnetic base body 20 can be reduced. In this way, it is possible to make the magnetic flux distribution in the magnetic base body more uniform.

When the filling factor of the metal magnetic particles in the magnetic base body 20 is low, the binder occupies a large proportion of the magnetic path in the magnetic base 20. If the ratio of the area where the binder is present in the magnetic path to the total length of the magnetic path increases, the effective permeability of each magnetic path varies in accordance with the ratio of the binder. Therefore, by increasing the filling factor of the metal magnetic particles in the magnetic base 20, it is possible to reduce the influence of the binder on the effective permeability of each magnetic path. In this way it is possible to achieve more remarkably the effect of the uniform magnetic flux distribution obtained by adjusting the average particle size of the metal magnetic particles and the film thickness of the insulating layer formed on the metal magnetic particles.

In one embodiment described above, both the first metal magnetic particles 31 and the second metal magnetic particles 32 contain Fe, and the content rate of Fe in the second metal magnetic particles 32 is higher than the content rate of Fe in the first metal magnetic particles 31. Since the second insulating layer 42 formed on the second metal magnetic particles 32 is thinner than the first insulating layer 41, there is a possibility that the second insulating layer 42 may be broken at the time of pressure molding. If the second insulating layer 42 is broken, the second metal magnetic particles 32 coated with the second insulating layer 42 are easily coupled electrically with adjacent other metal magnetic particles (the first metal magnetic particles, the second metal magnetic particles, or other metal magnetic particles). Since the magnetic flux is more likely to be concentrated on the two electrically connected metal magnetic particles than the state where they are not electrically coupled, the breakage of the second insulating layer 42 can be a cause of an non-uniform magnetic flux distribution. Therefore, even if the second insulating layer 42 is broken, by increasing the content ratio of Fe, which has a high saturation magnetic flux density, in the second metal magnetic particles 32, it is possible to reduce the concentration of magnetic flux on the second metal magnetic particles 32 that are uncovered with the second insulating layer 42.

In one embodiment described above, both the first metal magnetic particles 31 and the second metal magnetic particles 32 contain Si, and the content rate of Si in the first metal magnetic particles 31 is higher than the content rate of Si in the second metal magnetic particles 32. Since the content rate of Si in the first metal magnetic particles 31 is higher than the content rate of Si in the second metal magnetic particles 32, the first metal magnetic particles 31 are less likely to be deformed during pressure molding, whereas the second metal magnetic particles 32 are more easily deformed at the time of the pressure molding. As a result, the second metal magnetic particles can be arranged to fill the gaps between the first metal magnetic particles through the pressure molding process when forming the magnetic base body. In this way, the filling factor of the metal magnetic particles in the magnetic base body can be increased. Further, since deformation of the first metal magnetic particles at the time of pressurization are suppressed, stress strain inside the first metal magnetic particles can be reduced By reducing the stress strain of the first metal magnetic particle, it is possible to prevent deterioration of the magnetic permeability caused by the stress strain in the first metal magnetic particle.

In one embodiment described above, the magnetic base body further includes the third metal magnetic particles having the third average particle size smaller than the second average particle size and having the third insulating layer formed on the surface thereof. The filling factor of the metal magnetic particles in the magnetic base body 20 can be further increased by providing the third metal magnetic particles 33. Moreover, the third metal magnetic particles 33 are disposed between the first metal magnetic particles 31, between the second metal magnetic particles 32, and between the first metal magnetic particle 31 and the second metal magnetic particle 32 so that the mechanical strength of the magnetic base body 20 can be enhanced. As described above, since the third metal magnetic particles 33 have the third average particle size smaller than the first metal magnetic particles 31 and the second metal magnetic particles 32, the influence on the magnetic saturation characteristics of the magnetic base body 20 is small. Nevertheless, it contributes to the improvement of the filling factor of the magnetic base body 20 and the improvement of the mechanical strength of the magnetic base body 20.

In one embodiment describe above, the magnetic base body 20 includes the third metal magnetic particles 33, and the third metal magnetic particles 33 contain at least Ni or Co or both. In one embodiment, when the third metal magnetic particles 33 contain Fe, the content rate of Fe in the third metal magnetic particles 33 is lower than the content rate of Fe in the first metal magnetic particles 31 and the content rate of Fe in the second metal magnetic particles. Alternatively, the third metal magnetic particles 33 may not contain Fe in another embodiment. In the embodiment where the content rate of Fe in the third metal magnetic particles 33 is low, the third metal magnetic particles 33 become more difficult to oxidize than in the case where the content ratio of Fe in the third metal magnetic particles 33 is high. As a result, it is possible to prevent decrease in the magnetic permeability of the third metal magnetic particles 33 due to oxidation. The smaller the radius of the metal magnetic particles, the greater the influence of the change in the magnetic permeability caused by oxidation or other magnetic properties. In this respect, according to the above embodiment, by lowering the content rate of Fe (or Fe is not contained) in the third metal magnetic particles 33 having the smallest radius among the three types of metal magnetic particles having different average particle sizes from each other, it is possible to suppress the change in the magnetic properties of the small-sized third metal magnetic particles 33 caused by oxidation.

In one embodiment described above, at least one selected from the group consisting of the first insulating layer 41, the second insulating layer 42, and the third insulating layer 43 contains Si. When the first insulating layer 41, the second insulating layer 42, and the third insulating layer 43 contain Si, the insulating properties of the insulating layers can be enhanced.

In one embodiment described above, the first metal magnetic particles 31 contain Fe, and the first insulating layer 41 contains an oxide of Fe. As a result, the adhesion between the first metal magnetic particles 31 and the first insulating layer 41 can be enhanced, so that the occurrence of dielectric breakdown due to detachment of the first insulating layer 41 from the first metal magnetic particles 31 can be prevented.

The electronic component 10 that includes a coil in one embodiment described above includes the magnetic base body 20 and the coil 25 embedded in the magnetic base body 20. Since the magnetic flux distribution in the magnetic base body 20 becomes uniform when the coil 25 is excited, the allowable current of the electronic component 10 can be improved.

The above-described advantageous effects of the magnetic base body 20 also apply to the magnetic substrate 120. Also, the above-described effects described for the electronic component 10 including a coil also apply to the electronic component 110.

The dimensions, materials, and arrangements of the various constituent elements described herein are not limited to those explicitly described in the embodiments, and the various constituent elements can be modified to have any dimensions, materials, and arrangements within the scope of the present invention. Furthermore, constituent elements not explicitly described herein can also be added to the embodiments described, and it is also possible to omit some of the constituent elements described in the embodiments.

What is claimed is:

1. A magnetic base body, comprising:

first metal magnetic particles having a first average particle size; and second metal magnetic particles having a second average particle size smaller than the first average particle size, wherein a first insulating layer having a first thickness is formed on surfaces of the first metal magnetic particles, the first insulating layer containing an oxide of Fe, wherein a second insulating layer having a second thickness smaller than the first thickness is formed on surfaces of the second metal magnetic particles, the second insulating layer containing an oxide of Fe, wherein an average particle size of the second metal magnetic particles is one tenth or less of an average particle size of the first metal magnetic particles, wherein the magnetic base body is a solidified structure, and wherein the first insulating layer on the surfaces of the first metal magnetic particles is in direct contact with the second insulating layer on the surfaces of the second magnetic particles.

2. The magnetic base body of claim 1, wherein when an average particle size ratio is defined as a ratio of the second average particle size to the first average particle size and a thickness ratio is defined as a ratio of the second thickness to the first thickness, a ratio of the average particle size ratio to the thickness ratio is in the range of 0.5 to 1.5.

3. The magnetic base body of claim 1, wherein the first metal magnetic particles and the second metal magnetic particles both contain Fe, wherein a content rate of Fe in the second metal magnetic particles is higher than a content rate of Fe in the first metal magnetic particles.

4. The magnetic base body of claim 1, wherein the first metal magnetic particles and the second metal magnetic particles both contain Si, wherein a content rate of Si in the first metal magnetic particles is higher than a content rate of Si in the second metal magnetic particles.

5. The magnetic base body of claim 1, further comprising third metal magnetic particles having a third average particle size smaller than the second average particle size.

6. The magnetic base body of claim 5, wherein the third metal magnetic particles contain at least one selected from the group consisting of Ni and Co.

7. The magnetic base body of claim 1, wherein the first insulating layer contains Si.

8. The magnetic base body of claim 1, wherein the second insulating layer contains Si.

9. The magnetic base body of claim 1, further comprising third metal magnetic particles having a third average particle size smaller than the second average particle size and having a third insulating layer formed on surfaces thereof, wherein the third insulating layer contains Si.

10. The magnetic base body of claim 1, wherein the first metal magnetic particles contain Fe, and the first insulating layer contains an oxide of Fe.

11. The magnetic base body of claim 1, further comprising a binder.

12. An electronic component comprising the magnetic base body of claim 1.

13. An electronic component, comprising:

the magnetic base body of claim 1; and a coil provided in the magnetic base body.

14. The magnetic base body of claim 1, wherein the first metal magnetic particles contain 72 wt % to 80 wt % of Fe; and wherein the second metal magnetic particles contain 87 wt % to 99.8 wt % of Fe.

15. The magnetic base body of claim 3, further comprising third metal magnetic particles having a third average particle size smaller than the second average particle size, wherein a content rate of Fe in the third metal magnetic particles is lower than the content rate of Fe in the second metal magnetic particles.

16. The magnetic base body of claim 1, wherein said second metal magnetic particles are interspersed between said first metal magnetic particles such that the second metal magnetic particles establish interparticle distance between adjacent ones of the first metal magnetic particles with the first insulating layer on the surfaces of the first metal magnetic particles in direct contact with the second insulating layer on the surfaces of the second magnetic particles.

17. The magnetic base body of claim 16, wherein the smaller thickness of the second insulating layer increases uniformity of flux distribution in the magnetic base body.

* * * * *